(12) United States Patent
Kamijo

(10) Patent No.: US 7,280,173 B2
(45) Date of Patent: Oct. 9, 2007

(54) LIQUID CRYSTAL DISPLAY DEVICE, REFLECTOR, AND ELECTRONIC APPARATUS

(75) Inventor: Kimitaka Kamijo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 11 days.

(21) Appl. No.: 10/764,479

(22) Filed: Jan. 27, 2004

(65) Prior Publication Data
US 2004/0223097 A1    Nov. 11, 2004

(30) Foreign Application Priority Data
Feb. 21, 2003  (JP)  .............................. 2003-044659

(51) Int. Cl.
*G02F 1/1335*  (2006.01)
(52) U.S. Cl. ..................................... 349/113; 362/348
(58) Field of Classification Search ........ 349/113–115, 349/67; 362/609, 341, 348
See application file for complete search history.

(56) References Cited

U.S. PATENT DOCUMENTS

| | | | |
|---|---|---|---|
| 6,452,653 B1 * | 9/2002 | Yamanaka et al. | 349/113 |
| 6,600,534 B1 * | 7/2003 | Tanaka et al. | 349/113 |
| 6,873,384 B2 * | 3/2005 | Yamanaka et al. | 349/113 |
| 6,888,678 B2 * | 5/2005 | Nishiyama et al. | 359/599 |

FOREIGN PATENT DOCUMENTS

| | | |
|---|---|---|
| JP | A 08-095071 | 4/1996 |
| JP | A 11-271768 | 10/1999 |
| JP | A 2000-71379 | 3/2000 |
| JP | A 2000-221494 | 8/2000 |
| JP | A 2000-298274 | 10/2000 |
| JP | A 2001-194662 | 7/2001 |
| JP | A 2001-201743 | 7/2001 |
| JP | A 2002-072193 | 3/2002 |
| JP | A 2002-090512 | 3/2002 |
| JP | A 2002-258278 | 9/2002 |
| JP | A 2003-015129 | 1/2003 |

* cited by examiner

*Primary Examiner*—Thoi V. Duong
(74) *Attorney, Agent, or Firm*—Oliff & Berridge, PLC (57) ABSTRACT

To provide a liquid crystal display device having excellent viewability by efficiently reducing or preventing the occurrence of moire fringes caused by optical interference between the repeating irregularity arrangement and the repeating pixel arrangement, and preferably having ease of fabrication, in a liquid crystal display device an irregular surface composed of a plurality of depressions is formed on the surface of a reflective layer. The irregular surface includes at least two types of irregularity groups and having different shapes or sizes. Each of the irregularity groups and is composed of the substantially randomly arranged depressions in plan view, and the irregularity groups and the irregularity groups are substantially randomly arranged.

7 Claims, 8 Drawing Sheets

LIQUID CRYSTAL DISPLAY DEVICE, REFLECTOR, AND ELECTRONIC APPARATUS

BACKGROUND OF THE INVENTION

1. Field of Invention

The present invention relates to a liquid crystal display device, a reflector, and an electronic apparatus.

2. Description of Related Art

Reflective liquid crystal display devices have low power consumption since they have no light source, such as a backlight, and thus have commonly been used as display units for various kinds of mobile electronic apparatus and devices. Such a reflective liquid crystal display device has a structure in which a reflecting film and a liquid crystal layer are held between substrates, and light incident from one of the substrates is reflected by the reflecting film after passing through the liquid crystal layer and then passes through the liquid crystal layer again to be used for displaying.

The above-described reflecting film has a light scattering function for preventing specular reflection in order to obtain a bright display in a wide viewing angle range. For example, Japanese Unexamined Patent Application Publication No. 2000-298274 discloses that a plurality of depressions are continuously formed in two mutually orthogonal directions on the surface of the reflecting film and are arranged so as to make a predetermined angle relative to the extending direction of electrodes in a stripe pattern.

According to Japanese Unexamined Patent Application Publication No. 2000-298274, it is disclosed that the plurality of depressions formed in the two mutually orthogonal directions are arranged so as to make an angle with respect to the extending direction of the stripe-shaped electrodes so that moire fringes caused by optical interference between the repeating arrangement of the depressions and the repeating arrangement of the pixels of the liquid crystal display panel become hard to see. However, this related art technology makes moire fringes hard to be seen only by decreasing the interval of the moire fringes. Therefore, it is difficult to make moire fringes completely invisible with this related art technology.

SUMMARY OF THE INVENTION

The present invention has been directed to address the above problem. Accordingly, the present invention provides a liquid crystal display device having excellent viewability by efficiently reducing or preventing the occurrence of moire fringes caused by optical interference between the repeating arrangements of the depressions and pixels, and having ease of fabrication.

The present invention also provides a reflector having a suppressed occurrence of moire fringes caused by optical interference with the pixel arrangement of a liquid crystal display.

To address the above-mentioned problem, a liquid crystal display device according to an aspect of the present invention includes: a lower substrate, an upper substrate opposing the lower substrate, a liquid crystal layer disposed between the lower substrate and the upper substrate, and a reflective layer on the inner surface or the outer surface of the lower substrate; an irregular surface including a plurality of irregularities being formed on the surface of the reflective layer, the irregular surface including at least two types of irregularity groups having different shapes or sizes, each of the irregularity groups having substantially randomly arranged irregularities in plan view, and the irregularity groups being substantially randomly arranged.

In this structure, the irregular surface on the surface of the reflective layer has the irregularity groups each having a pattern in which irregularities are randomly arranged as an arrangement unit, resulting in considerably easy formation of the irregular surface on the surface of the reflective layer. In general, the irregular surface is formed by either a replication process by using a mother die having the inverted shape of a shape to be formed, or a photolithographic process. In the former method by a replication process, the shape of the irregularities of the mother die can be efficiently formed by using the irregularity groups as a formation unit of the irregular surface of the mother die when fabricating the mother die. In the latter method by a photolithographic process, compared to the case where exposure data for all the depressions must be kept in forming the irregularities of the reflective layer, the amount of data can be advantageously significantly decreased.

Further, the above-described patterned irregularity groups are substantially randomly arranged on the surface of the reflective layer, thereby suppressing periodicity of the irregularity groups themselves. As a result, the occurrence of moire fringes caused by optical interference with the pixel pattern of the liquid crystal display device can be reduced or prevented.

That is, according to an aspect of the present invention, efficiently reducing or preventing the occurrence of moire fringes caused by optical interference with the repeating pixel arrangement can provide a liquid crystal display device having excellent viewability and ease of fabrication.

A liquid crystal display device according to an aspect of the present invention may include: a lower substrate, an upper substrate opposing the lower substrate, a liquid crystal layer disposed between the lower substrate and the upper substrate, and a reflective layer on the inner surface or the outer surface of the lower substrate; an irregular surface including a plurality of irregularities being formed on the surface of the reflective layer, the irregular surface including irregularity groups each of which has substantially randomly arranged irregularities in plan view, and the irregular surface including periodically repeating arrangements of the irregularities with a plurality of the irregularity groups as a repetition unit.

Also in this structure, since the irregularity groups serve as an arrangement unit of the irregular surface on the surface of the reflective layer, the formation of the irregular surface on the surface of the reflective layer can be facilitated. In addition, periodic repetition of the irregularity group in the irregular surface enables the irregularities to be formed on the surface of the reflective layer more efficiently. The periodic repetition of a plurality of the irregularity groups can easily reduce or prevent the occurrence of moire fringes caused by optical interference between the above-described periodic repetition and the periodic arrangement of the pixels. In particular, if the repetition unit of the irregularity groups that is periodically repeated is non-rectangular, the occurrence of moire fringes can efficiently be reduced or prevented.

In the liquid crystal display device according to an aspect of the present invention, the irregularity groups may be aligned in one direction in the irregular surface to form rows and the planar position of the irregularity groups may be shifted with respect to adjacent rows.

In this structure, aligning the irregularity groups in one direction facilitates forming the irregular surface on the reflective layer, while shifting the positions of the irregularity groups with respect to adjacent rows eliminates periodicity of the irregularities in the direction orthogonal to the rows and efficiently reduces or prevents the occurrence of moire fringes.

Preferably, in the liquid crystal display device according to an aspect of the invention, the planar shift length between adjacent rows of the irregularity groups is substantially constant. This structure can simplify the arrangement of the irregularity groups on the reflective layer, thus facilitating the fabrication.

Preferably, in the liquid crystal display device according to an aspect of the present invention, the shift length between adjacent rows of the irregularity groups is 10% to 40% of the length of the row of the irregularity groups. This range of the shift length can reduce or prevent the occurrence of moire fringes more efficiently.

In the liquid crystal display device according to an aspect of the present invention, the irregularity groups may be aligned in one direction in the irregular surface to form rows and each of the rows may include at least two types of the irregularity groups having different lengths along the extending direction.

This structure can efficiently reduce or prevent periodicity of the irregularity groups in both the traverse and longitudinal directions of the rows, thus obtaining a high quality display without moire fringes.

Preferably, in the liquid crystal display device according to an aspect of the present invention, irregularity groups having different lengths along the line are randomly arranged in the rows.

This structure can more efficiently suppress periodicity of the irregularity groups in the rows, thus providing a liquid crystal display device having more suppressed moire fringes.

In the liquid crystal display device according to an aspect of the present invention, the direction of the rows may be substantially parallel to a direction of pixel arrangement of the liquid crystal display device. This structure can facilitate fabrication of the mother die or production of the exposure pattern when the irregularities on the reflective layer are formed.

In the liquid crystal display device according to an aspect of the present invention, the planar shapes of the irregularity groups may be substantially rectangular. In this structure, the irregularity groups can be easily arranged on the reflective layer without any spaces therebetween, thereby increasing the fabrication efficiency of the reflective layer.

In the liquid crystal display device according to an aspect of the present invention, at least one irregularity may be formed at the boundaries of the adjacent irregularity groups.

While the arrangement of the planar rectangular irregularity groups is liable to generate a flat area near the boundaries of the irregularity groups, according to the above structure, the irregularities are formed at the boundaries of adjacent irregularity groups and thus the flat area formed on the surface of the reflective layer can be decreased. As a result, this structure can efficiently reduce or prevent specular reflection of light caused by the flat area, thus providing a liquid crystal display device having excellent viewability.

In the liquid crystal display device according to an aspect of the present invention, the planar shapes of the irregularity groups may be substantially quadrangular and the shapes of two opposing edges of the irregularity groups may be substantially the same.

In this structure, the irregularity groups having substantially the same shape are continuously arranged so that the irregularity groups can be positioned without any spaces therebetween on the surface of the reflective layer. As a result, this structure decreases the flat area on the surface of the reflective layer, thus enhancing the viewability of the liquid crystal display device.

Preferably, in the liquid crystal display device according to an aspect of the present invention, the lengths of the irregularity groups are different from the pitch of the pixels of the liquid crystal display device in the extending direction.

This structure suppresses optical interference between the arrangement of the pixels and the arrangement of the irregularity groups, thus suppressing the occurrence of moire fringes.

Preferably, in the liquid crystal display device according to an aspect of the present invention, the length of a repetition unit of the irregularity groups in the direction of the pixels is different from the pitch of the pixels.

This structure reduces or prevents optical interference between the arrangement of a plurality of the irregularity groups and the arrangement of the pixels, thus suppressing the occurrence of moire fringes.

According to another aspect of the present invention, there is provided a reflector including a substrate and a reflective layer formed on the substrate; an irregular surface including a plurality of irregularities being formed on the surface of the reflective layer, the irregular surface including at least two types of the irregularity groups having different shapes or sizes, each of the irregularity groups having substantially randomly arranged irregularities in plan view, and the irregularity groups being substantially randomly arranged.

Another reflector according to an aspect of the present invention includes a substrate and a reflective layer formed on the substrate; an irregular surface including a plurality of irregularities being formed on the surface of the reflective layer, the irregular surface including irregularity groups each of which has substantially randomly arranged irregularities in plan view, and the irregular surface including periodically repeating arrangement of the irregularities with a plurality of the irregularity groups as a repetition unit.

According to the above-described reflector, the irregularity groups each having a pattern in which irregularities are randomly arranged and serve as an arrangement unit in the irregular surface on the surface of the reflective layer, resulting in significantly easy formation of the irregular surface on the surface of the reflective layer. Further, the above-described irregularity groups are arranged substantially randomly or making a combination of a plurality of the irregularity groups. Consequently, for example, when the reflector is assembled in a liquid crystal display device having a plurality of pixels in a matrix pattern, optical interference between the arrangement of the pixels and the arrangement of the irregularity groups can be efficiently reduced or prevented.

An electronic device according to an aspect of the present invention includes the above-described liquid crystal display device according to an aspect of the present invention. This structure can provide an electronic apparatus having a liquid crystal display with reduced or no moire fringes and excellent viewability.

DETAILED DESCRIPTION OF EXEMPLARY EMBODIMENTS

Exemplary embodiments of the present invention will now be described with reference to the figures.

Liquid Crystal Display Device

Figure 1:
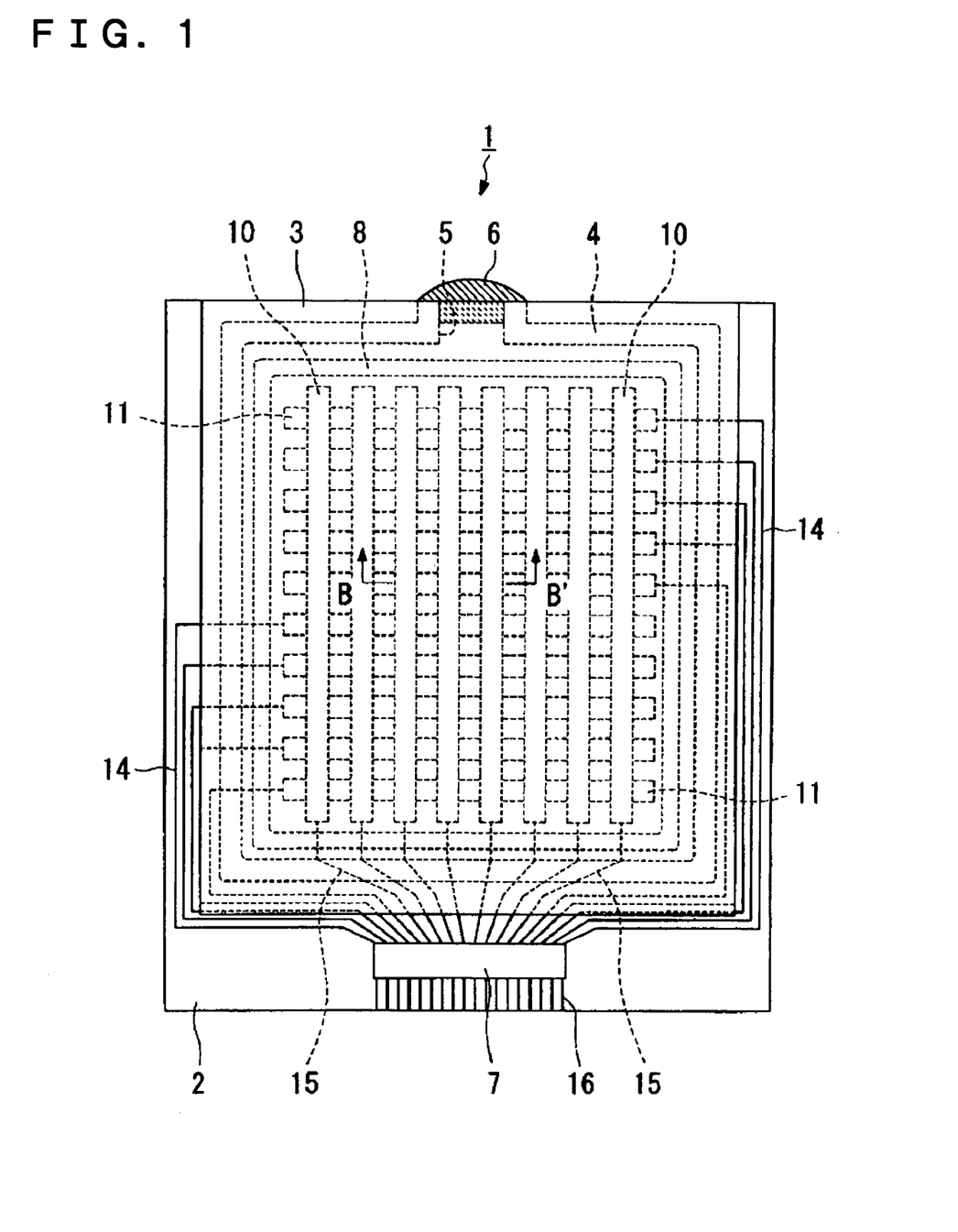
FIG. 1 is a plan view of a liquid crystal display device according to an exemplary embodiment of the present invention.
Figure 2:
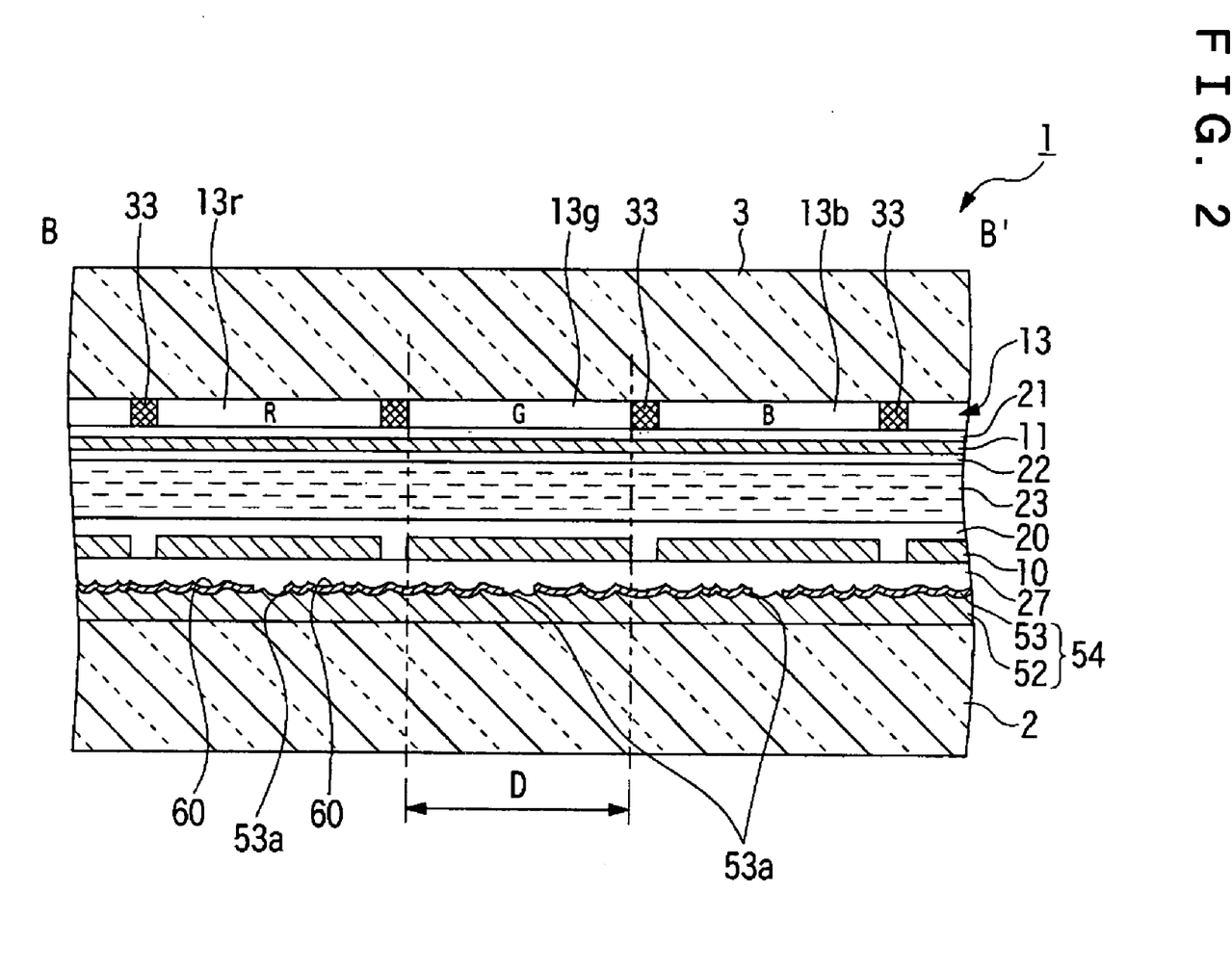
FIG. 2 is a sectional view along plane B-B' in FIG. 1.

FIG. 1 is a plan view showing the overall structure of a liquid crystal display device according to an exemplary embodiment of the present invention. FIG. 2 is a view showing a display area of the liquid crystal display device, which is a transverse sectional view along plane B-B' in FIG. 1. In this exemplary embodiment, a passive-matrix transflective color liquid crystal display device is adopted as an example, in which a built-in reflective layer having openings for transmissive display is disposed on the inner surface of a lower substrate. In the figures, the scales of the thicknesses and dimensions of the components are appropriately altered from the actual ones for ease of understanding.

Referring to FIG. 1, a liquid crystal display 1 according to an exemplary embodiment of the present invention includes a lower substrate 2 and an opposing upper substrate 3, which are rectangular in plan view and made of glass or plastic, with a substantially frame-shaped seal 4 therebetween. A part of the seal 4 is open in one of the edges of the substrates 2 and 3 (the upper edge in FIG. 1) to form a liquid crystal filling port 5. Liquid crystal is enclosed within the space formed by the two substrates 2 and 3 and the seal 4. The liquid crystal filling port 5 is sealed with a sealant 6. In this exemplary embodiment, the lower substrate 2 has bigger outer dimensions than the upper substrate 3. They are disposed such that one edge of the upper substrate 3 and one edge of the lower substrate 2 (the upper edge in FIG. 1) are aligned but the other three edges of the lower substrate 2 extend further than the corresponding edges of the upper substrate 3 (the lower edge, the right edge, and the left edge in FIG. 1). A semiconductor component 7 to drive electrodes of the upper substrate 3 and the lower substrate 2 is mounted at the end of the lower edge of the lower substrate 2. Numeral 8 denotes a light shielding film (a dividing bead) to shield the periphery of the display area against light.

In this exemplary embodiment, as shown in FIG. 1, a plurality of segment electrodes 10, which extend longitudinally in the figure, are formed on the lower substrate 2 in a pattern of stripes. On the other hand, a plurality of common electrodes 11, which extend transversely and thus orthogonally to the segment electrodes 10 in the figure, are formed on the upper substrate 3 in a pattern of stripes. To perform color display, color layers for respective colors R, G, and B in a color filter are disposed in the direction of the respective segment electrodes 10 (in a vertical-striped pattern, that is, the respective color layers longitudinally extend to form the stripe pattern) and one pixel in the display is composed of a set of R, G, and B dots aligned in the transverse direction. Areas where the segment electrodes 10 and the common electrodes 11 overlap each other in plan view correspond to dots D shown in FIG. 2. In addition, a "viewing area" is an area inside the light shielding film 8 where a plurality of the dots are arranged in a matrix. The viewing area is an effective area that contributes to displaying.

Referring to FIG. 2 showing the cross sectional view, a reflective layer 54, which is composed of a resin layer 52 and a reflective film 53, is formed on the lower substrate 2. The resin layer 52 has a plurality of depressions 60 (these may be depressions and/or protrusions; hereinafter, the exemplary embodiment will be described using depressions) on the upper surface which opposes the reflective layer 53. A plurality of depressions 60 are disposed in the dot D. The reflective film 53 is formed over the surface of the resin layer 52, which has the plurality of depressions 60, using a metal having a high light reflectivity, such as aluminum or silver. As a result, irregular surface serving as the reflective surface of the reflective layer 54 is formed. In addition, the reflective film 53 has openings 53a for transmissive display formed in respective pixel areas.

A planarizing film 27 composed of a resin film, such as an acrylic resin film and a polyimide resin film, or an insulating film, such as a silicon oxide film, is formed on the reflective layer 54. The segment electrodes 10, which are made of Indium Tin Oxide (hereinafter referred to as ITO), are formed on the planarizing film 27 in a stripe pattern in the direction perpendicular to the figure. Alignment layers 20 made of, for example, polyimide resin whose surface is processed by rubbing are formed over the segment electrodes 10.

On the other hand, a color filter 13 composed of color layers 13r, 13g, and 13b for the respective colors R, G, and B is formed on the upper transparent substrate 3, such as a glass or plastic substrate. A resin overcoat film 21 is formed on the color filter 13 to planarize gaps between the respective color layers and to protect the surfaces of the color layers. Further, the common electrodes 11, which are composed of ITO films, are formed on the overcoat film 21 in the direction parallel to the figures in a stripe pattern. Alignment layers 22 made of, for example, polyimide resin whose surface is processed by rubbing are formed over the common electrodes 11.

Liquid crystal 23, such as Super Twisted Nematic (STN) liquid crystal, is disposed between the upper substrate 3 and the lower substrate 2. In addition, black stripes 33 made of resin black or a metal having relatively low reflectivity, such as chrome, are disposed such that they delimit the R, G, and B color layers 13r, 13g, and 13b to form boundaries therebetween.

Since the liquid crystal display device 1 according to the exemplary embodiment has the reflective layer 54 having the reflective surface on which the plurality of depressions 60 are formed, reflected light can be diffused in a wide angular range. As a result, specular reflection by the reflective layer 54 is suppressed and thus a bright reflective display is obtained over a wide viewing angle range.

Figure 3:
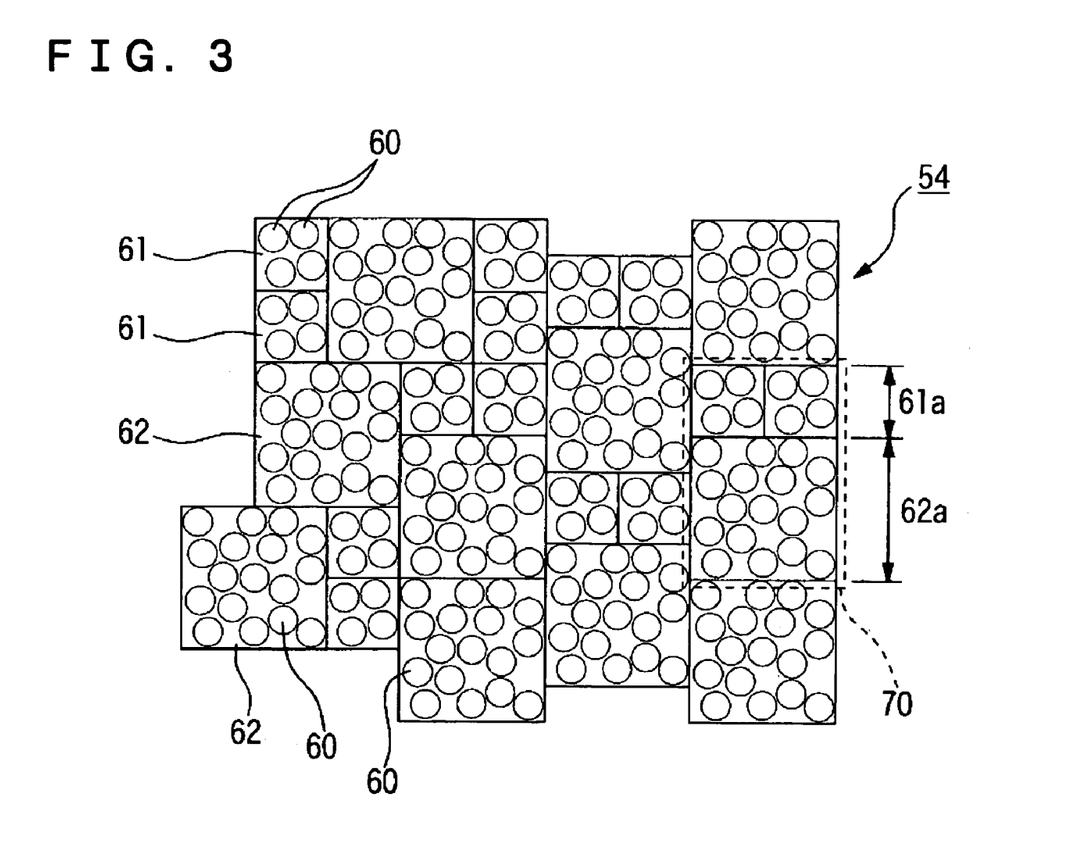
FIG. 3 is a partial plan view showing a structure example of the reflective layer according to the exemplary embodiment.
Figure 4:
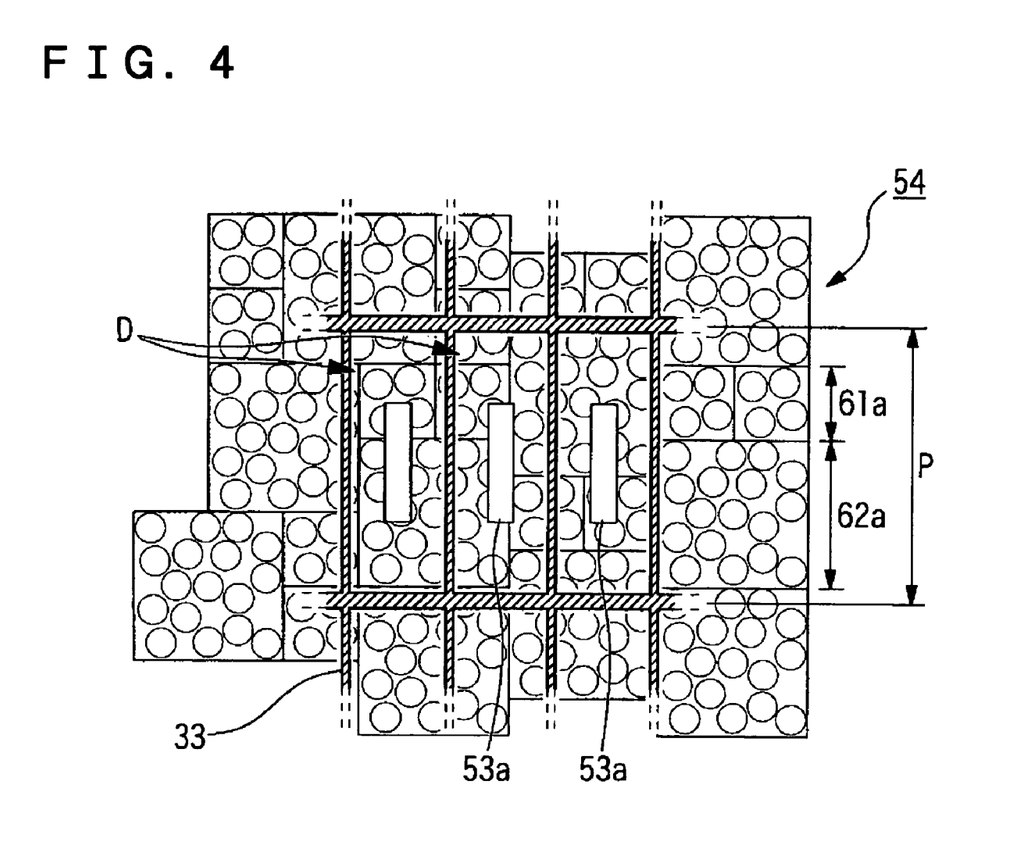
FIG. 4 is a plan view illustrating the reflective layer of FIG. 3 and black stripes superposed thereon.
Figure 5:
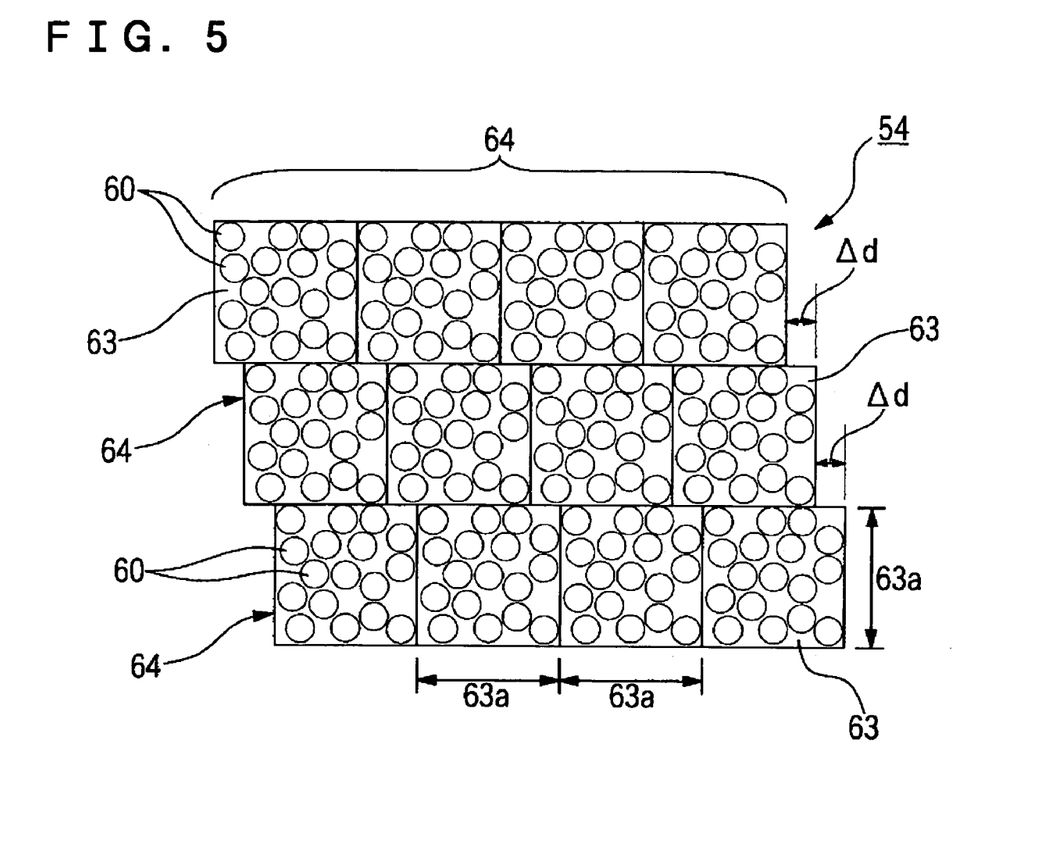
FIG. 5 is a partial plan view of another structure example of the reflective layer according to an exemplary embodiment.
Figure 6:
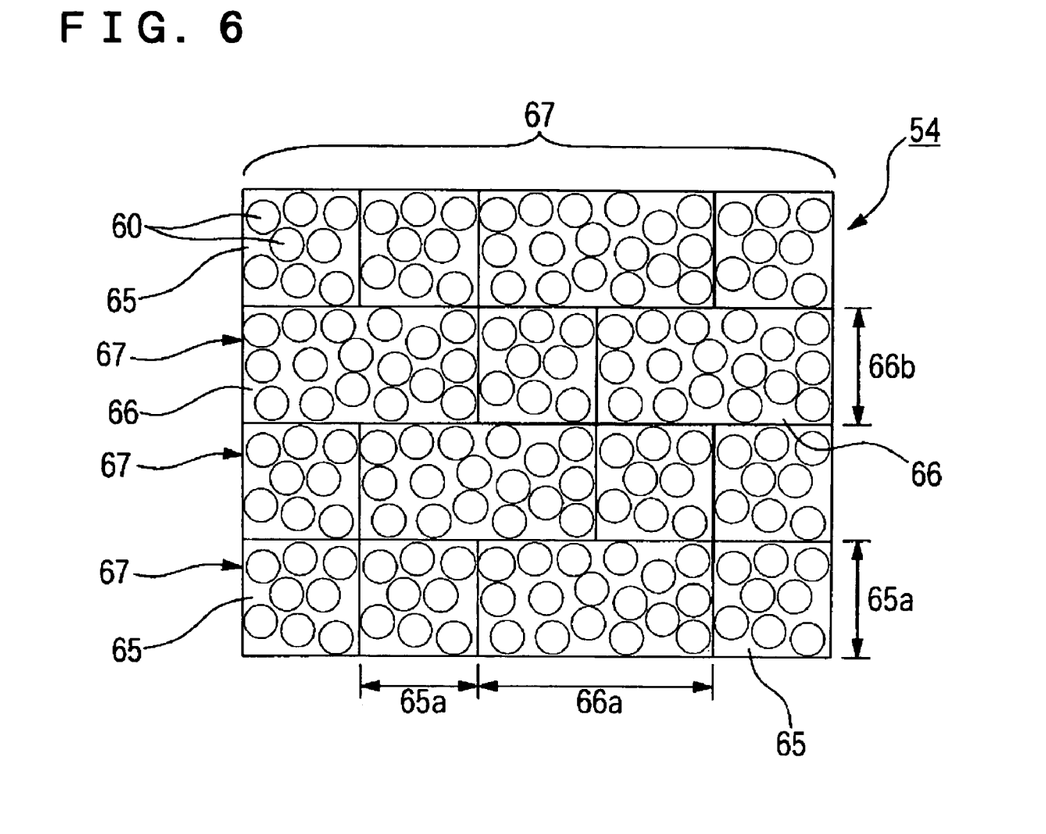
FIG. 6 is a partial plan view of another structure example of the reflective layer according to an exemplary embodiment.

Features of the reflective layer 54 according to an aspect of the present invention are the above-mentioned plurality of depressions 60 and the structure of the irregular surface. The reflective layer 54 according to the exemplary embodiment of the present invention will now be described with reference to FIGS. 3 to 6 in more detail. FIGS. 3, 5, and 6 are plan views showing structure examples of the reflective layer 54 according to the exemplary embodiment. FIG. 4 is a plan view of the structure showing the relationship between the reflective layer shown in FIG. 3 and the black stripes 33. In FIGS. 3, 5, and 6, the opening 53a in each dot area in the reflective film 53 are not shown for the sake of simplifying the figures.

FIRST STRUCTURE EXAMPLE OF REFLECTIVE LAYER

A structure example shown in FIG. 3 will now be described. FIG. 3 is a partial plan view of the reflective layer 54. The reflective layer 54 according to this example has a structure in which a plurality of irregularity groups 61 and irregularity groups 62, each of which is square in plan view, are randomly arranged in a common plane. Each of the irregularity groups 61 and 62 has a plurality of depressions 60. That is, this is one of the various structures of the reflective layer according to an aspect of the present invention, in which an irregular surface including a plurality of irregularities is formed on the surface of the reflective layer, the irregular surface includes at least two types of irregularity groups having different shapes or sizes, each of the irregularity groups has substantially randomly arranged irregularities in plan view, and the irregularity groups are substantially randomly arranged.

The depressions 60 according to the exemplary embodiment are substantially circular in plan view, as shown in FIG. 3, and the diameter is about 8 to 15 μm. The depth of the each depression 60 is about 0.2 to 2.5 μm.

The above-described irregularity groups 61 and 62 have different pitches (the lengths of the edges) and have the depressions 60 arranged in random patters in the regions. That is, although the depressions 60 are randomly arranged in each region of the irregularity groups 61 and 62, if the respective irregularity groups 61 are compared to each other, they have the same arrangement of the depressions 60. Accordingly, the reflective layer 54 in this example reduces or prevents a periodically repeating pattern of the irregularities from being formed on the reflecting surface of the reflective layer 54 by randomly arranging the irregularity groups 61 and 62 in which the depressions 60 are arranged in predetermined patterns, thereby reducing or preventing the occurrence of moire fringes caused by optical interference between the irregular surface on the reflective layer 54 and the pixels or the black stripes 33.

When the above-described reflective layer 54 is fabricated, the following exemplary two methods, for example, can be adopted: (1) resin molding using a mother die having an irregular surface of a predetermined area, or (2) patterning of a resin film by a photolithographic process. In particular, in the case where the reflective layer 54 is formed on the lower substrate 2 by exemplary Method (1), a plurality of depressions are formed on the surface of a metal plate by stamping an indenter having a predetermined top shape thereon to produce a primary die. Then, the shape of the primary die is transferred to a resin material to produce a mother die. The mother die is pressed onto a resin material coated on the lower substrate 2 to transfer the shape of the surface of the mother die. The resin material is cured to produce the resin layer 52 having a plurality of depressions on the surface. Subsequently, the reflective film 53 is formed on the resin layer 52 by sputtering, resulting in the reflective layer 54 formed on the lower substrate 2.

In the case of exemplary Method (2), a resin material, such as acrylic resin, is coated on the lower substrate 2 to form a first resin film, and a photoresist is coated thereon. The photoresist is patterned in a predetermined form and then the photoresist and the resin film are etched to form a plurality of irregularities. A second resin film made of acrylic resin or the like is formed so as to cover the irregularities. Thus, the resin layer 52 having a plurality of depressions on the surface is formed. Subsequently, the reflective film 53 is formed on the resin layer 52 by sputtering, resulting in the reflective layer 54 formed on the lower substrate 2.

The irregularities of the reflective layer 54 according to the exemplary embodiment are composed of the rectangular irregularity groups 61 and 62, thereby achieving high diffusion efficiency and reducing or preventing the occurrence of moire fringes. In particular, the following advantages are provided when the reflective layer 54 is formed.

In exemplary Method (1), a replication process can be employed in which stamping an indenter produces primary dies, each having the shape of the irregularity group 61 or 62, followed by sequentially transferring the shapes of the primary dies to the resin material. Consequently, compared to fabricating a primary die for the entire planar area of the reflective layer 54, the fabricating time of the primary dies is significantly decreased. Further, this method has an advantage in that the shape of the irregularities of the reflective layer 54 can readily be changed.

In exemplary Method (2), a pattern for exposing the photoresist can be repetition of the irregularity groups 61 and 62. Consequently, compared to the case where a pattern for the entire surface of a reflective layer in which depressions are randomly arranged is made, the load on a photolithographic machine can be significantly decreased.

Furthermore, referring to FIG. 3, the irregularity groups 61 and 62 are rectangular in plan view so that the arrangement thereof can be easily designed in both Methods (1) and (2). A new pattern (a repetition unit) can be produced by combining a plurality of the irregularity groups 61 and 62, and the irregular surface of the reflective layer 54 can readily be formed by repeating the pattern.

In this example, while the rectangular irregularity groups 61 and 62 are rectangular in plan view to provide the above-mentioned advantages, the shapes of the irregularity groups 61 and 62 are not limited thereto. They may be of any shape, for example, substantially polygonal, substantially elliptical, or may be combinations of complicated curved lines. However, such non-rectangular irregularity groups impair the easy designing of random arrangement of the irregularity groups 61 and 62; thus, a symmetrical shape (or a repeating shape) along one direction is preferable.

Preferably, at least three depressions 60 are included in each of the irregularity groups 61 and 62. Less than three depressions 60 cannot provide the advantage of the patterned irregularity groups 61 and 62.

In addition, preferably, the depressions 60 are continuously and densely arranged within the irregularity groups 61 and 62. Some portions of adjacent depressions 60 may overlap each other. Such densely arranged depressions 60 can decrease the flat area on the surface of the reflective layer 54 and increase the diffusion efficiency of the reflected light, thus enhancing the brightness of the liquid crystal display device and the viewing angle dependency of the brightness.

FIG. 4 is a plan view which illustrates the positional relationship between the reflective layer 54 and the black stripes 33 in the case where the reflective layer 54 shown in FIG. 3 is applied to the liquid crystal display device 1. Referring to FIG. 4, the openings 53a formed in the reflective layer 54 are disposed in the areas of the respective dots D which are delimited by the latticed black stripes 33. At least a part of the plurality of irregularity groups 61 and 62 is arranged in these areas.

To readily achieve this structure, referring to FIG. 4, a pixel pitch P is preferably different from pitches 61a and 62a of the respective irregularity groups 61 and 62. The pixel pitch P and the pitches 61a and 62a vary in accordance with the design of the liquid crystal display device 1. More preferably, the pitches 61a and 62a are also different from the pitch of the dots D, which is the pitch in the transverse direction in the figure. Thus, differences among the pitches 61a and 62a, the transverse pitch of the dot D, and the pixel pitch P allow a plurality of the irregularity groups 61 and 62 to be arranged in the pixel area on the reflective layer 54. As a result, optical interference between the patterns of the irregularity groups 61 and 62 and the black stripes 33 can be easily suppressed, thereby providing liquid crystal display devices having no moire fringes and excellent viewability.

Furthermore, in the case where a new pattern (a repetition unit) is produced by two-dimensionally arranging a plurality of the irregularity groups 61 and 62 and then the irregular surface of the reflective layer 54 is formed by randomly and two-dimensionally arranging the pattern, the dimensions of the above-described pattern (the lengths of the edges), the pixel pitch P, and desirably the pitch of the dots D are preferably different from one another to reduce or prevent the occurrence of moire fringes. For example, in the reflective layer 54 shown in FIG. 3, a new pattern 70 may be produced by one irregularity group 62 and two irregularity groups 61 aligned on one edge of the irregularity group 62, as indicated in the area surrounded by the dotted line in the figure. The irregular surface of the reflective layer 54 may be composed by arranging the patterns 70. In this case, according to an aspect of the present invention, the pitch of the pattern 70 (the length of the longitudinal edge in the figure, which is the sum of the pitches 61a and 62a) is preferably different from the pixel pitch P, thus efficiently reducing or preventing the occurrence of moire fringes.

Furthermore, in the above-described example, while the pattern composed of the two irregularity groups 61 and one irregularity group 62 is rectangular in plan view, the shape of the pattern composed of a plurality of the irregularity groups is not limited thereto. It may be of any shape. However, a shape that allows the patterns to be closely arranged without any spaces therebetween is preferable for the formation of the irregular surface on the reflective layer 54.

In this exemplary embodiment, the substantially circular depressions 60 in plan view are formed on the surface of the reflective layer 54; however, the shape of the depressions applied to the reflective layer according to an aspect of the present invention is not limited thereto. That is, they may be tiny protrusions instead of the depressions 60 and both depressions and protrusions may be formed on the reflective layer 54.

SECOND STRUCTURE EXAMPLE OF REFLECTIVE LAYER

FIG. 5 is a plan view illustrating a second structure example of the reflective layer 54 according to the exemplary embodiment. In the reflective layer 54 shown in the figure, a plurality of square irregularity groups 63 in plan views, each of which has a pattern in which the depressions 60 are randomly formed in plan view, are arranged on the reflective layer 54. In particular, the irregularity groups 63 are sequentially arranged in the transverse direction in the figure to form a row 64 and a plurality of the rows 64 are longitudinally arranged. The positions of the irregularity groups 63 are transversely shifted for every row.

That is, this is one of the various structures of the reflective layer according to the exemplary embodiment, in which an irregular surface including a plurality of irregularities is formed on the surface of the reflective layer, the irregular surface includes irregularity groups, each of the irregularity groups has substantially randomly arranged irregularities in plan view, the irregular surface includes periodically repeating arrangement of the irregularities with a plurality of the irregularity groups as a repetition unit, the irregularity groups are aligned in one direction to form rows, and the planar position of the irregularity groups is shifted with respect to adjacent rows.

Also in this example, like the irregularity groups 61 and 62 in the first exemplary embodiment, the pitch of the irregularity group 63 is different from the pixel pitch P of the liquid crystal display device. Furthermore, the pitch (longitudinal and traverse pitches) of the row 64 determined by the arrangement of the irregularity groups 63 is preferably different from the pixel pitch. This structure can reduce or prevent the occurrence of moire fringes more efficiently.

The reflective layer 54 having the above-described structure of this example also suppresses the periodicity of the irregularity groups 63 in the longitudinal direction in the figure, thus achieving a liquid crystal display device in which moire fringes are reduced or prevented efficiently. In particular, the structure of this example suppresses optical interference between periodic occurrences of the irregularity group 63 and vertical periodic occurrences (in the longitudinal direction in the figure) of the latticed black stripes 33 shown in FIG. 3.

Referring to FIG. 5, the amount of shift Δd of the irregularity groups 63 between adjacent rows is preferably 10% to 40% of a pitch 63a (the length of the edge in the direction orthogonal to the rows). The arrangement of the rows 64 having the amount of shift Δd in this range can almost eliminate vertical periodicity (in the longitudinal direction in the figure), thereby achieving a liquid crystal display device having no moire fringes and, therefore, high-quality display capability. If Δd is smaller than 10% or greater than 40% of the pitch 63a, the periodicity is likely to occur near the vertical ends of the irregularity group 63, thus generating moire fringes.

Also in this exemplary embodiment, the irregularity group 63 is square in plan view; however, the shape of the irregularity group is not limited thereto. Like the first exemplary embodiment, an irregularity group having a rectangular or a non-rectangular shape in plan view may be applied to the reflective layer 54. For example, an irregularity group having a substantially quadrangular shape whose two opposing edges are substantially identical and non-linear can be used instead of the irregularity group 63 shown in FIG. 5. This structure can ease the arrangement of the irregularity groups in one direction and make the boundaries of the irregularity groups non-linear, thus decreasing the likeliness that the flat area is formed near the boundaries. As a result, a reflective layer having high diffusion efficiency can be obtained.

THIRD STRUCTURE EXAMPLE OF REFLECTIVE LAYER

FIG. 6 is a plan view illustrating a third structure example of the reflective layer 54 according to the exemplary embodiment. In the reflective layer 54 shown in the figure, a plurality of rectangular irregularity groups 65 and 66, each of which has a pattern in which the depressions 60 are randomly formed in plan view, are arranged on the reflective layer 54. In particular, the irregularity groups 65 and 66 are sequentially arranged in the transverse direction in the figure to form a row 67, and a plurality of the rows 67 are arranged in the longitudinal direction. The irregularity groups 65 and 66 are randomly arranged in each row 67. The irregularity group 65 shown in FIG. 6 is square in plan view and has an identical pitch 65a in both the transverse and vertical directions. On the other hand, the irregularity group 66 is rectangular in plan view and the transverse pitch 66a is twice the longitudinal pitch 66b in the figure. The pitch 66b is identical to the above-described pitch 65a of the irregularity group 65.

That is, this is one of the various structures of the reflective layer according to the exemplary embodiment, in which an irregular surface including a plurality of irregularities is formed on the surface of the reflective layer, the irregular surface includes irregularity groups, each of the irregularity groups has substantially randomly arranged irregularities, the irregular surface includes periodically repeating arrangement of the irregularities with a plurality of the irregularity groups as a repetition unit, the irregularity groups are aligned in one direction to form rows, and the row includes at least two types of the irregularity groups having different lengths along the extending direction.

Also in this exemplary embodiment, like the first and the second examples, the pitches of the irregularity groups 65 and 66 are different from the pixel pitch P of the liquid crystal display device. Furthermore, the row pitch 67 (both in the longitudinal and traverse directions) determined by the arrangement of the irregularity groups 65 and 66 is preferably different from the pixel pitch. As a result, this structure can reduce or prevent the occurrence of moire fringes more efficiently.

The reflective layer 54 having the above-described structure of this example also suppresses longitudinal periodicity of the irregularity groups 65 and 66, thus achieving a liquid crystal display device in which moire fringes are suppressed more efficiently. In particular, the structure of this example can suppress optical interference between the periodic occurrences of the irregularity groups 65 and 66 and vertical periodic occurrences (in the longitudinal direction in the figure) of the latticed black stripes 33 shown in FIG. 4.

Also in this exemplary embodiment, while the irregularity groups 65 and 66 are rectangular in plan view, the shape of the irregularity group is not limited thereto. Like the second example, the irregularity group having a non-rectangular shape may be applied to the reflective layer 54. For example, an irregularity group having a substantially quadrangular shape in plan view whose two opposing edges are substantially identical and non-linear can be used instead of the irregularity groups 65 and 66 shown in FIG. 6. Employing such a shape eases the arrangement of the irregularity groups in one direction and makes the boundaries of the irregularity groups non-linear boundaries, thus decreasing the likeliness that flat area is formed near the boundaries. As a result, a reflective layer having high diffusion efficiency can be obtained.

FOURTH STRUCTURE EXAMPLE OF REFLECTIVE LAYER

Figure 7:
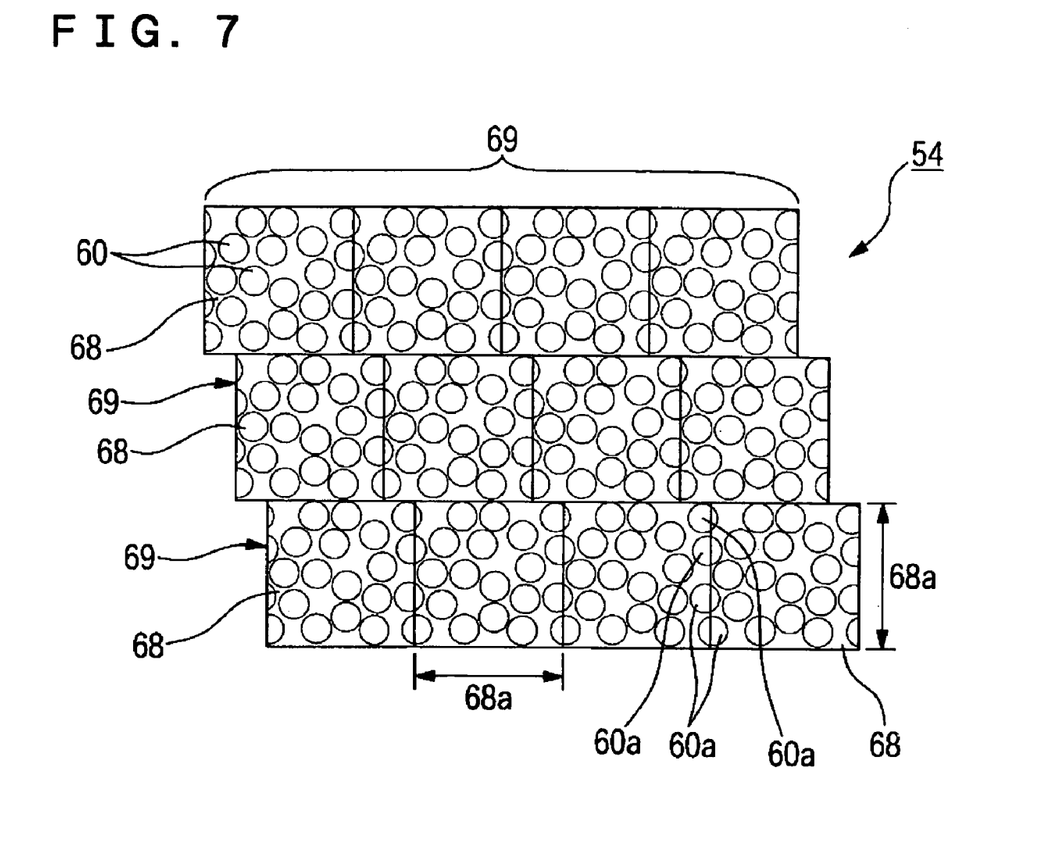
FIG. 7 is a partial plan view of another structure example of the reflective layer according to an exemplary embodiment.

FIG. 7 is a plan view illustrating a fourth structure example of the reflective layer 54 according to the exemplary embodiment. In the reflective layer 54 shown in the figure, a plurality of square irregularity groups 68 in plan view, each having a pattern in which the depressions 60 are randomly formed in plan view, are arranged on the reflective layer 54. In particular, the irregularity groups 68 are sequentially arranged in the transverse direction in the figure to form a row 69 and a plurality of the rows 69 are arranged in the longitudinal direction in the figure. Some depressions (irregularities) 60a are formed at the boundaries of the irregularity groups 68 in the traverse direction. The irregularity groups 68 have an identical pitch 68a in both the transverse and vertical directions in the figure.

That is, this is one of the various structures of the reflective layer according to an aspect of the present invention, in which an irregular surface including a plurality of irregularities is formed on the surface of the reflective layer, the irregular surface includes irregularity groups, each of the irregularity groups has substantially randomly arranged irregularities, the irregular surface includes periodically repeating arrangement of the irregularities with a plurality of the irregularity groups as a repetition unit, and at least one irregularity is formed at the boundaries of the irregularity groups.

The feature of this example is that some of the depressions 60a are formed at the boundaries of the irregularity groups 68. This structure can decrease the flat area on the surface of the reflective layer 54, thus obtaining a reflective layer having high diffusion efficiency. That is, when the rectangular irregularity groups 68 in plan view are arranged, the flat area is increased near the boundaries of the irregularity groups 68, thus increasing the amount of light specularly reflected by the surface of the reflective layer. On the other hand, the depressions 60a formed at the boundaries reduced or prevent the flat area from being formed so that the specular reflection of light incident on the reflective layer 54 can be efficiently reduced or prevented.

The reflective layer 54 having the above-described structure of this example also suppresses periodicity of the irregularity group 68 in the longitudinal direction in the figure, thus achieving a liquid crystal display device in which moire fringes are efficiently reduced or prevented. In particular, the structure of this example suppresses optical interference between periodic occurrences of the irregularity group 68 and vertical periodic occurrences of the latticed black stripes 33 shown in FIG. 4 (in the longitudinal direction in the figured).

This example has been described of the case where all the depressions 60 are completely included in the regions of the rectangular irregularity groups 68 in plan vies; however similar advantages are obtained if parts of the depressions 60 are located on the edges of the rectangular irregularity group 68. That is, the formation of substantially fan-shaped depressions, instead of circular depressions in plan view, on the edges of the irregularity groups 68 can reduce or prevent a flat surface area from being formed near the edges of the irregularity groups 68.

Electronic Device

Figure 8:
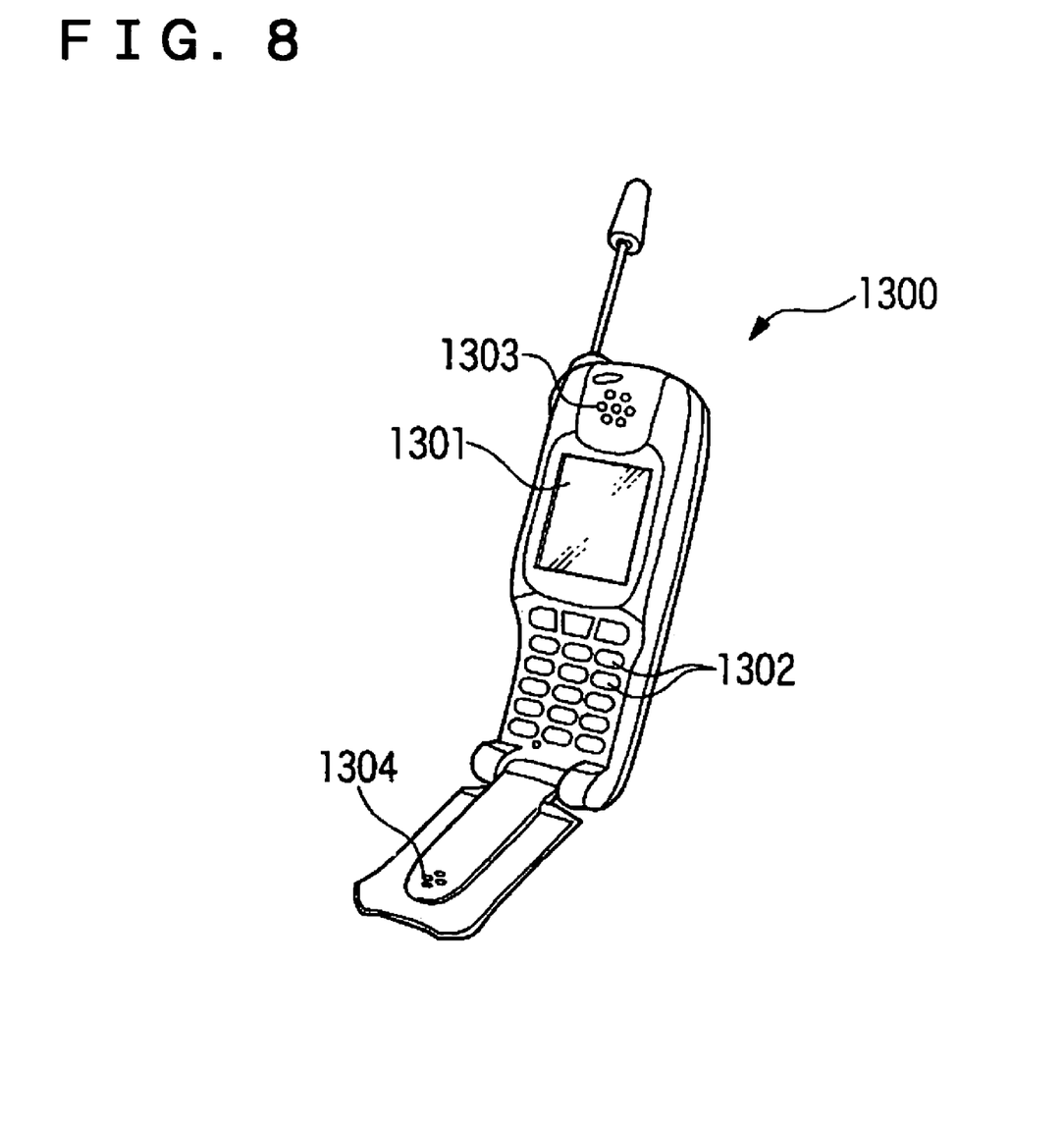
FIG. 8 is a perspective view of an example of electronic apparatus according to an aspect of present invention.

FIG. 8 is a perspective view of a mobile telephone, which is an example of an electronic apparatus having a liquid crystal display device according to an aspect of the present invention as a display unit. A mobile telephone 1300 has the liquid crystal display device according to an aspect of the present invention as a compact display unit 1301, a plurality of operation buttons 1302, an earpiece 1303, and a mouthpiece 1304.

The application of the liquid crystal display device according to the above-described exemplary embodiments is not limited to the mobile telephone. It can be appropriately applied to electronic books, personal computers, digital still cameras, liquid crystal display TVs, view finder-type or direct view CRT-type video cassette recorders, car navigation systems, pagers, personal digital assistances, portable calculators, word processors, workstations, TV phones, point-of-sale (POS) terminals, and apparatus having touch-screens, as display units of the apparatus, and can provide high-quality display for all such electronic apparatus.

Reflector

A reflector according to an aspect of the present invention includes a substrate and a reflective layer on the substrate, an irregular surface including a plurality of irregularities being formed on the surface of the reflective layer, the irregular surface including irregularity groups, each of the irregularity groups has substantially randomly arranged irregularities in plan view, and the irregular surface including at least two types of the irregularity groups having different shapes or sizes arranged randomly or in a periodically repeating manner with a plurality of the irregularity groups as a repetition unit.

According to an exemplary embodiment of the reflector, the reflector includes the lower substrate 2 included in the liquid crystal display device shown in FIG. 2 and the reflective layer 54. The planarizing film 27 which covers the reflective layer 54 may be included. In such a case, the above-described structure examples 1 to 3 can be applied to the reflective layer 54 without any difficulties.

A reflective liquid crystal display device can easily be produced by mounting this reflector on the back side of a transmissive liquid crystal display panel. A transflective liquid crystal display device can be produced by disposing openings on the reflective layer 54 corresponding to dots of a liquid crystal display panel.

In the reflector according to the exemplary embodiment, the reflective layer having any one of the structures shown in the above-described exemplary embodiments can reduce or prevent optical interference with the repeating pixel arrangement of the liquid crystal display panel, which is disposed in front of the reflector, so that a display device having excellent viewability without moire fringes can be obtained.

While the exemplary embodiments of a liquid crystal display device and a reflector according to an aspect of the present invention have been described, the present invention is not limited to the above-described exemplary embodiments, and many changes can be made without departing from the scope and spirit of the present invention. For example, while a passive-matrix, transflective, color liquid crystal display device is described in the exemplary embodiments of the liquid crystal display device, the present invention can be applied, for example, to an active-matrix liquid crystal display device, a reflective liquid crystal display device, and a monochromatic liquid crystal display device without any difficulties. In addition, the reflector according to an aspect of the present invention is not limited to be assembled in a liquid crystal display panel. The reflector can be used as it is as a diffusing plate and can be assembled in various display devices.

What is claimed is:

1. A liquid crystal display device, comprising:
a lower substrate;
an upper substrate opposing the lower substrate;
a liquid crystal layer disposed between the lower substrate and the upper substrate;
a pixel region including pixels juxtaposed at a pixel pitch, the pixels each having a length and a width; and
a reflective layer on an inner surface or an outer surface of the lower substrate, the reflective layer including an irregular surface including at least two types of different irregularity groups having different shapes or sizes, each irregularity group having substantially randomly arranged irregularities in plan view, the irregularity groups being substantially randomly arranged in plan view, the different irregularity groups each having a length that is shorter than the length or width of the pixels and a width that is shorter than the length or width of the pixels, and the at least two types of different irregularity groups being disposed within a single pixel in plan view.

2. The liquid crystal display device according to claim 1, the planar shapes of the irregularity groups being substantially rectangular.

3. The liquid crystal display device according to claim 2, at least one irregularity being formed at each of the boundaries between the adjacent irregularity groups.

4. The liquid crystal display device according to claim 1, the planar shapes of the irregularity groups being substantially quadrangular and the shapes of two opposing edges of the irregularity groups are substantially the same.

5. An electronic device, comprising:
the liquid crystal display device according to claim 1.

6. A reflector, comprising:
a substrate;
a reflective layer formed on the substrate; and
a pixel region including pixels juxtaposed at a pixel pitch, the pixels each having a length and a width;
the reflective layer including an irregular surface including at least two types of different irregularity groups having different shapes or sizes, each irregularity group having substantially randomly arranged irregularities in plan view, the irregularity groups being substantially randomly arranged, the different irregularity groups each having a length that is shorter than the length or width of the pixels and a width that is shorter than the length or width of the pixels, and the at least two types of different irregularity groups being disposed within a single pixel in plan view.

7. A liquid crystal display device, comprising:
a lower substrate;
an upper substrate opposing the lower substrate;
a liquid crystal layer disposed between the lower substrate and the upper substrate;
a pixel region including pixels juxtaposed at a pixel pitch, the pixels each having a length and a width; and
a reflective layer on an inner surface or an outer surface of the lower substrate, the reflective layer including an irregular surface including a plurality of irregularities, the irregular surface including:
a first pattern of substantially randomly arranged irregularities, the first pattern having a length that is shorter than the length or width of the pixels and a width that is shorter than the length or width of the pixels, and being disposed within a single pixel in plan view; and
a second pattern of substantially randomly arranged irregularities, the second pattern having a length that is shorter than the length or width of the pixels and a width that is shorter than the length or width of the pixels, and being disposed with a single pixel in plan view, both the length and width of the first pattern being different from the length and width of the second pattern, the irregularities in the second pattern being different from the irregularities in the first pattern; and a portion of the first pattern and a portion of the second pattern being both disposed within a single pixel in plan view.

\* \* \* \* \*